(12) United States Patent
Ding

(10) Patent No.: US 11,379,640 B2
(45) Date of Patent: Jul. 5, 2022

(54) RESERVOIR REGIONS MANAGEMENT WITH UNSTRUCTURED GRID RESERVOIR SIMULATION MODEL

(71) Applicant: Saudi Arabian Oil Company, Dhahran (SA)

(72) Inventor: Xiang Yang Ding, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 291 days.

(21) Appl. No.: 16/737,386

(22) Filed: Jan. 8, 2020

(65) Prior Publication Data
US 2020/0226311 A1    Jul. 16, 2020

Related U.S. Application Data

(60) Provisional application No. 62/793,100, filed on Jan. 16, 2019.

(51) Int. Cl.
*G06F 30/27* (2020.01)
*G01V 99/00* (2009.01)
(Continued)

(52) U.S. Cl.
CPC ............ *G06F 30/27* (2020.01); *G01V 99/005* (2013.01); *E21B 43/00* (2013.01); *E21B 2200/20* (2020.05);
(Continued)

(58) Field of Classification Search
CPC .... G06F 30/27; G06F 16/252; G06F 2113/08; G01V 99/005; E21B 43/00; E21B 2200/20
(Continued)

(56) References Cited

U.S. PATENT DOCUMENTS

| 2011/0313745 A1* | 12/2011 | Mezghani | ............... | G06T 17/05 |
| | | | | 703/10 |
| 2013/0035913 A1* | 2/2013 | Mishev | .................. | G01V 11/00 |
| | | | | 703/2 |

(Continued)

OTHER PUBLICATIONS

Klemetsdal, Ø. S., et al. "Unstructured gridding and consistent discretizations for reservoirs with faults and complex wells." SPE Reservoir Simulation Conference. OnePetro, 2017. pp. 1-28. (Year: 2017).*

(Continued)

*Primary Examiner* — Kamini S Shah
*Assistant Examiner* — John E Johansen
(74) *Attorney, Agent, or Firm* — Bracewell LLP; Constance G. Rhebergen; Brian H. Tompkins

(57) ABSTRACT

Reservoir management based on unstructured grid reservoir simulation is improved with machine learning based intelligent automation. Reservoir heterogeneity, geological internal boundary features and well geometry complexity are taken into account to automatically detect well zone and focusing reservoir area by calculating the region-of-interests in the model and defining cell spacing for grid coarsening and refinement in the reservoir. Data points for wells in the reservoir are grouped into reservoir regions according to datasets organized as a convex hull, which is a minimum convex set in spatial geometry which encloses the totality of such data points. The reservoir regions form a basis for grid spacing utilized in the reservoir model.

18 Claims, 8 Drawing Sheets

(51) Int. Cl.
*G06F 113/08* (2020.01)
*G06F 16/25* (2019.01)
*E21B 43/00* (2006.01)

(52) U.S. Cl.
CPC ........ *G06F 16/252* (2019.01); *G06F 2113/08* (2020.01)

(58) Field of Classification Search
USPC .......................................................... 703/10
See application file for complete search history.

(56) References Cited

U.S. PATENT DOCUMENTS

| | | | |
|---|---|---|---|
| 2014/0236559 A1* | 8/2014 | Fung .................... | G01V 99/005 703/10 |
| 2015/0260016 A1* | 9/2015 | Fung .................... | G01V 99/005 703/10 |
| 2019/0325331 A1* | 10/2019 | Benhallam .............. | E21B 41/00 |

OTHER PUBLICATIONS

Fung, Larry SK, Xiang Y. Ding, and Ali H. Dogru. "Using unstructured grids for modeling densely-spaced complex wells in field-scale reservoir simulation." IPTC 2013: International Petroleum Technology Conference. European Association of Geoscientists & Engineers, 2013. pp. 1-14. (Year: 2013).*

International Search Report and Written Opinion for related PCT application PCT/US2020/013928 dated May 6, 2020.

Aziz, K. Reservoir Simulation Technology: Accomplishments and Challenges, SPE-10-101503-DL, SPE Distinguished Lecturer Series, 2003-2004.

Ding, X. Y., An Unstructured Gridding Method for Simulating Faulted Reservoirs Populated with Complex Wells, SPE Reservoir Simulation Symposium, Feb. 23-25, 2015, Houston, TX, US.

Fung, L.S.K., An Unstructured Gridding Method for Densely-Spaced Complex Wells in Full-Field Reservoir Simulation, SPE Reservoir Simulation Symposium, Feb. 18-20, 2013, The Woodlands, TX, US, SPE 163648.

Fung, L.S.K., Unconstrained Voronoi Grids for Densely Spaced Complex Wells in Full-Field Reservoir Simulation, SPE Reservoir Simulation Symposium, The Woodlands, TX, Oct. 1, 2014, SPE 163648.

Fung, L.S.K., Using Unstructured Grids for Modeling Densely-Spaced Complex Wells in Field-Scale Reservoir Simulation, International Petroleum Technology Conference, Mar. 26-28, 2013, Beijing, CN.

* cited by examiner

RESERVOIR REGIONS MANAGEMENT WITH UNSTRUCTURED GRID RESERVOIR SIMUATION MODEL

This application claims the benefit of U.S. Provisional Patent Application No. 62/793,100, filed Jan. 16, 2019, entitled "Machine Learning Determination and Allocation of Well Data Points with Convex Hull for Reservoir Regions in Unstructured Grid Reservoir Simulation."

BACKGROUND OF THE INVENTION

1. Field of the Invention

The present application relates to modeling in reservoir simulation, and more particularly, machine learning determination and allocation of well data points for reservoir regions in unstructured grid reservoir simulation.

2. Description of the Related Art

Reservoir simulation has been routinely used in oil/gas companies for reservoir management and new field development. Most reservoir simulation models use a structured grid reservoir model due to ease of cell block referencing with structured grid models. Structured grid reservoir models have a long history of utilization. The simulation workflow with structured grids has been well established with mature pre/post processing software available in the market.

However, when there are complicated geological features in the reservoir, such as complex well, fracture or fault, properly modeling these geological features is often a challenge for structured grid models. Structured grid reservoir models can be very difficult if higher levels of accuracy are required from the modeling.

Unstructured grid modeling has become an active subject in research and development as its grid flexibility and un-constrained cell connectivity. These features of unstructured grid modeling make reservoir simulation suitable for dealing with irregular geometry complexity of the subsurface reservoir. Unstructured grid modeling has gained popularity because of an increased demand for modeling more complicated geological features in the reservoir. The complicated geological features may take the form of complex geological boundaries and irregular geometry of complex wells, such as horizontal wells or Maximized Reservoir Contact (MRC) wells.

In addition, many of the complex wells can even in intersect each other, or intersect with geological features such as fractures or faults. The presence of complex geological features and wells has made use of unstructured grid desirable for addressing such modeling and simulation challenges. In current simulation practice, however, so far as is known use of unstructured grids has usually been limited to small-scale simulations, due to the lack of mature simulation workflow for full field-scale simulation.

Recently, an unconstrained unstructured gridding method for field-scale reservoir simulation has been developed. One mayor component of the workflow is a near-well unstructured grid modeling framework including what is known as a 2.5D unstructured perpendicular bisector or PEBI grid engine. Input criteria for the PEBI grid include locations of reservoir where grid coarsening and refinement are being applied, along with respective cell spacing which is being allocated. Formation of such regions of interest and selection of cell spacing involve user's interaction defining the input criteria for the PEBI grid, which is dependent on the level of experience of a user. This can cause inconsistencies in the simulation workflow.

A full cycle workflow of reservoir simulation integrates well data, grid generation, model building, simulation, result visualization and analysis into a composite functioning system. The integrated workflow has been used on various field models and gained user acceptance, based on the quality of grid model formed, and increased speed of reservoir simulation computer processing. Increased speed in computer processing reduces computer processing time and expense. However, the requirement for user manual interaction input data integration and unstructured grid model construction has resulted in a technological problem in reservoir simulation.

SUMMARY OF THE INVENTION

Briefly, the present invention provides a new and improved method of generating an unstructured grid model with actual well trajectory of at least one individual well of a plurality of wells of a subsurface reservoir during reservoir simulation by a reservoir simulator of a computer comprising a memory and a processor the generating of the model being based on input data defining internal boundary geometry and internal boundary descriptions of the reservoir model provided the computer, and on well trajectory and completion data for the wells in the reservoir obtained during drilling of the wells.

According to the present invention, computer operable instructions causing the processor to generate the unstructured grid with actual well trajectory of at least one individual well during the reservoir simulation are stored in the computer memory. The processor under control of the stored computer operable instructions receives from the memory well perforation location coordinates of the wells in the unstructured grid model of the reservoir based on the well trajectory and completion data for the wells. The processor then forms a well dataset of well trajectory locations in the reservoir.

A convex hull of the well dataset of well trajectory locations is then determined by the processor. The processor then transforms the convex hull into at least one reservoir region of the unstructured grid model of the plurality of wells of the subsurface reservoir.

DETAILED DESCRIPTION OF THE PREFERRED EMBODIMENTS

Figure 1A:
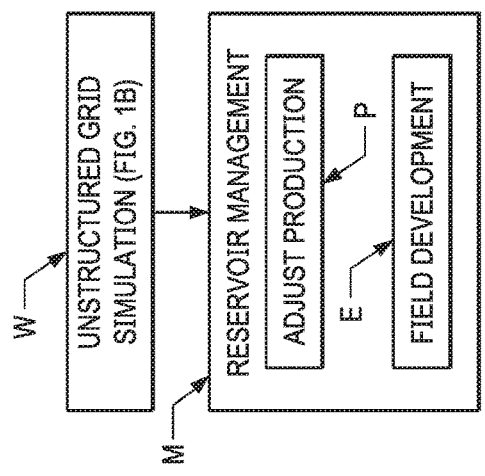
FIG. 1A is a functional block diagram of a method of reservoir management with reservoir simulation with an unstructured grid reservoir model according to the present invention.

In the drawings, FIG. 1A is schematic diagram of the methodology of the present invention for reservoir management with reservoir simulation with an unstructured grid reservoir model according to the present invention. As indicated in FIG. 1A, the methodology includes an unstructured grid simulation workflow W of forming an unstructured grid reservoir model with actual trajectories for an individual well or a plurality of wells in the reservoir. The wells may include production wells, injection wells and observation wells spaced over the extent of the reservoir. When the unstructured grid reservoir model is formed, reservoir simulation of fluid flow during production of hydrocarbon fluids form the reservoir is performed, as indicated at step 112.

As indicated at M, a reservoir management phase or stage is then performed based on the results of the reservoir simulation during step 112. The reservoir management phase/stage M takes the form of either or both of a process of adjustment of production from one or more of the reservoir wells as indicated at P, and field development F.

A suitable method of adjustment of reservoir production P may, for example, be of the type described in U.S. Pat. Nos. 8,078,328 and 8,312,320, (Attorney Docket Nos. SA 586 and 606, respectively) commonly owned by the assignee of the present application. The subject matter disclosed in U.S. Pat. Nos. 8,078,328 and 8,312,320 is incorporated herein by reference. The field development operation F may take the form of drilling additional exploration or production wells.

Figure 11:
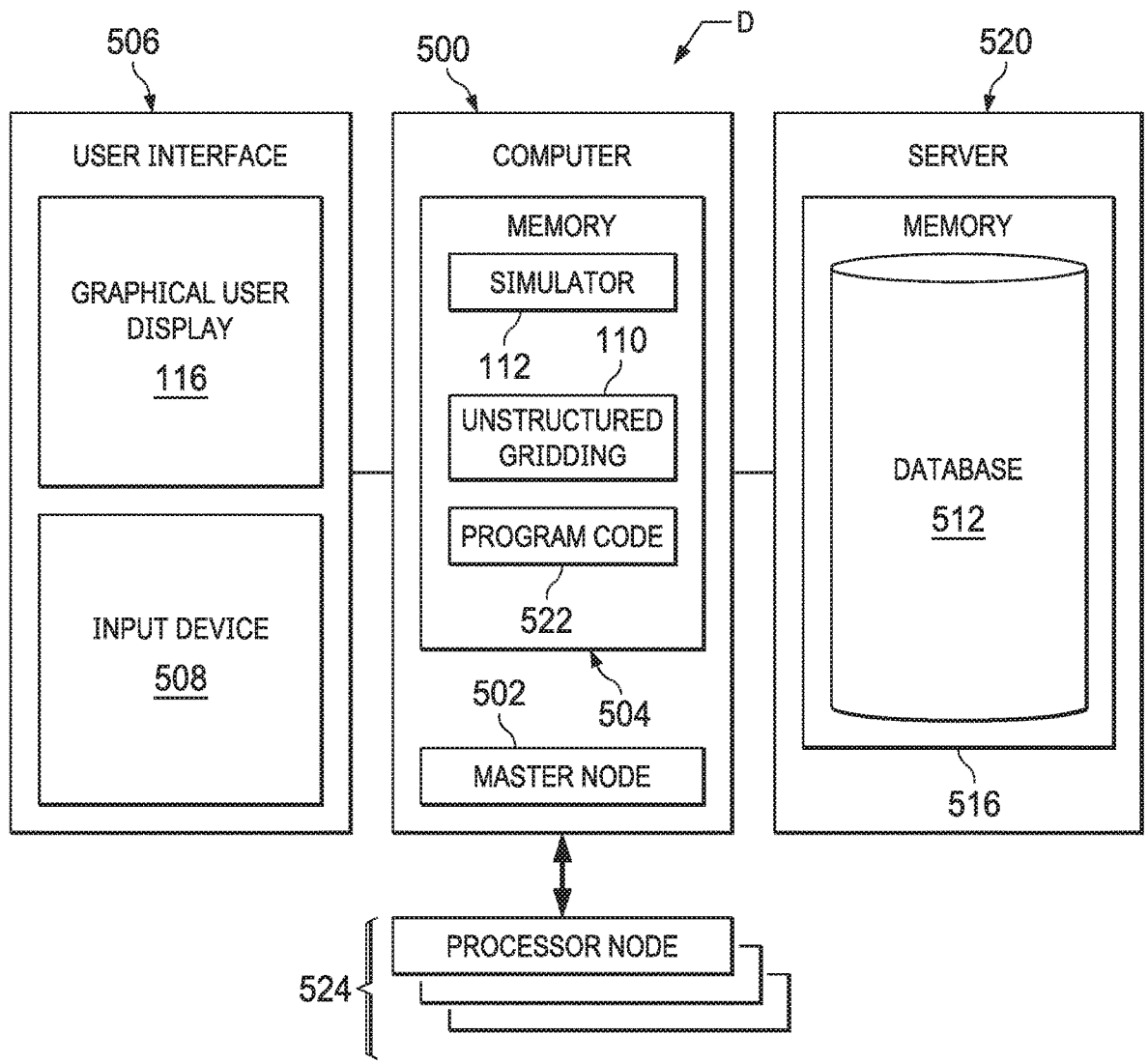
FIG. 11 is a schematic diagram of a computer network for structured and unstructured reservoir grid modeling according to the present invention.

The reservoir simulation 112 of the unstructured grid model formed during workflow W is performed with a data processing system D (FIG. 11). The unstructured grid simulation workflow W is a full cycle workflow of transitioned stages including well data preparation, unstructured grid model builder, reservoir simulation and result analysis. The input data source can be from a well database or an existing simulation model which is in the form of a structured grid.

Figure 1B:
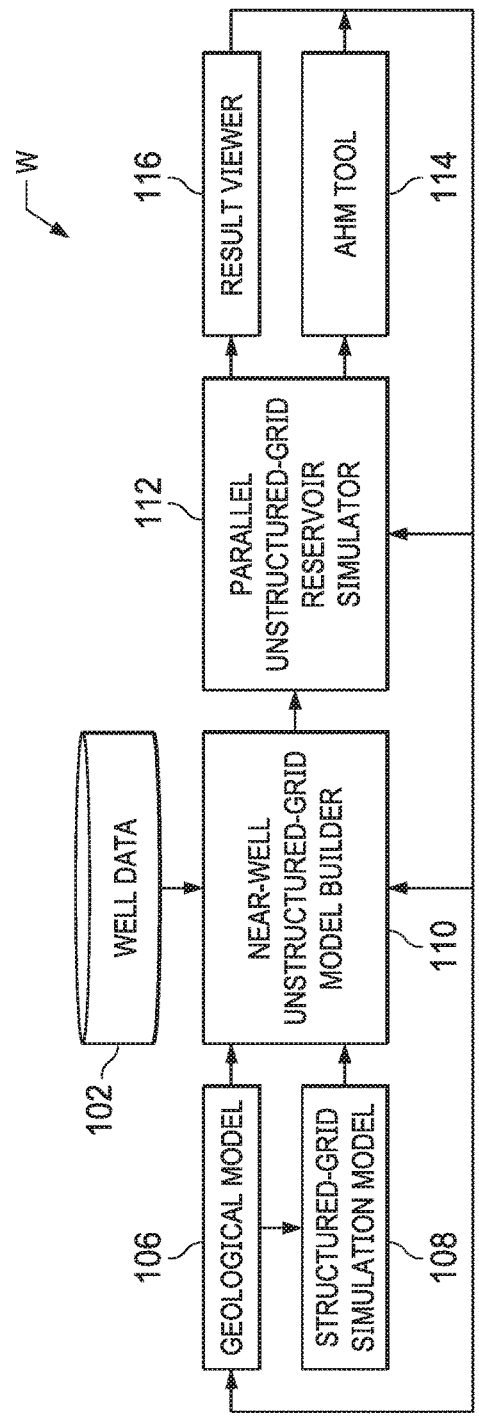
FIG. 1B is a functional block diagram of a workflow or flow chart of computer processing steps of FIG. 1A for reservoir simulation with an unstructured grid reservoir model according to the present invention.

The workflow W generates a near-well unstructured grid and performs machine learning determination and allocation of well data points with convex hull for reservoir regions in unstructured grid reservoir simulation in accordance with the present invention. As shown in FIG. 1B, well trajectory and completion data 102 for wells in a reservoir are obtained. The well trajectory and completion data are provided from a well database having well trajectory survey data and completion data with time and completion intervals. The well trajectory data includes sets of x-y-z spatial points describing the wellbore spatial locations of each branch of each well (e.g., conventional or complex MRC wells). The completion data also includes the start and end points of each completion interval along the wellbores and the time intervals when that completion is open to flow.

Additionally, the well data 102 includes future wells (e.g., well trajectory data for future wells). The future well data includes data for planned future wells in a reservoir and may be in various formats, such as an ASCII data file, an existing structured grid reservoir simulation model recurrent data file, or other suitable formats. The workflow W also includes a structured geological model 106 (also referred to as a "geocellular model") obtained from a geological modeling process. The structured geological model 106 is constructed from a geocellular model for a field for the purpose of reservoir simulation. The structured geological model 106 describes the geometry and property data for one or multiple reservoirs. Further, a structured grid simulation model 108 is also present. The structured grid simulation model 108 is generated by upscaling the structured geological model 106. In such embodiments, the model geometry of the structured grid simulation model 108 may be defined by corner point geometry (CPG) format or variable-depth variable-thickness Cartesian (IJK) grid format. In some embodiments, the structured grid simulation model 108 takes the form of a previously history matched dataset or a partially matched dataset.

Figure 2:
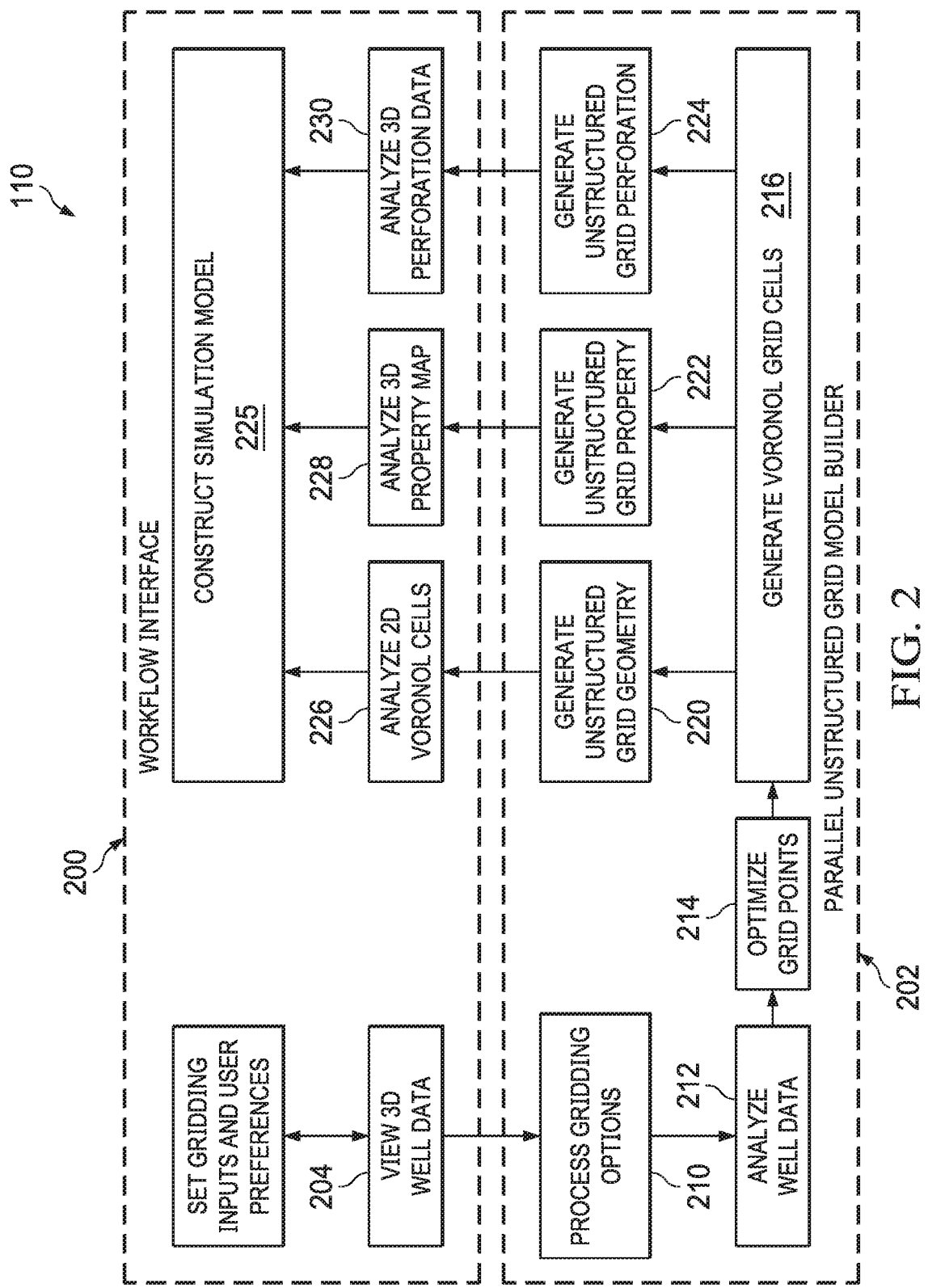
FIG. 2 is a more detailed functional block diagram of a portion of the functional block of FIG. 1B.

As described further below, one or more of the well data 102, and the structured geological model 106, the structured grid simulation model 108, or each of them, are provided as inputs to a near-well unstructured grid model builder 110. Additionally, in some embodiments the future well data is provided as input to the near-well unstructured grid model builder 110 for performance prediction. The near-well unstructured model builder 110 is illustrated in FIG. 2 and described in further detail below. The workflow W may also include a parallel reservoir simulator 112 for performing a reservoir simulation based on the unstructured grid model generated by the near-well unstructured grid model builder 110. In the disclosed embodiment, the parallel reservoir simulator 112 may be the GigaPOWERS™ as is described in connection with the data processing system D (FIG. 11). The parallel reservoir simulator 112 may perform a reservoir simulation using the near-well unstructured grid generated by the near-well unstructured grid model builder 110.

The workflow W also includes an assisted history match (AHM) tool 114. The AHM tool 114 performs simulation model updates for reservoir history match processing, and also is capable of performing sensitivity analyses over a range of parameters to determine the response surface of the reservoir simulation. The AHM tool 114 provides a methodology to generate multiple simulation data sets which is submitted to the parallel reservoir simulator 112. For example, each simulation for each such simulation data sets may each be a parallel job running on an assigned group of computation nodes in high performance computing (HPC) system.

Additionally, the workflow W includes an unstructured grid reservoir simulation result viewer and data analyzer 116. The result viewer and data analyzer 116 may include an import engine to input the results (e.g., result files) from the parallel reservoir simulation 112 for post simulation analysis and visualization with the data processing system D. The structured geological model 106 is updated based on the analysis and visualization provided by the results viewer 116.

In accordance with the present invention, the near-well unstructured grid model builder 110 generates an unstructured grid reservoir model and builds a ready to use simulation model for the purposes of reservoir simulation. The structural components of the ell unstructured grid model builder 110 are shown in FIG. 2.

The near-well unstructured grid model builder 110 as shown in FIG. 2 includes a workflow interface 200 and a parallel unstructured grid model builder 202. The workflow interface 200 enables a user to view 2-D or 3-D well data with the data processing system D as indicated at 204.

Within the parallel unstructured grid model builder 202, the unstructured gridding data input to the builder 202 is processed by a process gridding options functionality 210 by being verified and then provided for further processing within the parallel unstructured grid model builder 202. After the gridding options for the input data are processed, the well trajectory and perforation data obtained from the existing well trajectory and completion data 102 and future well data 104 is analyzed in a well data analyzer module 212. Next, the grid points of the unstructured grid are optimized by a grid points optimization module 214.

Next, the generated grid points are used in a Voronoi grid cell generation module 216 to perform an unconstrained Delaunay triangulation of the entire field domain, and the Delaunay triangulation is used to generate Voronoi grid cells. An example of this functionality is described in Applicant's Published United States Patent Application No. 2014/0236559 dated Aug. 21, 2014.

Unstructured grid geometry is generated in an unstructured grid geometry generation module 220. The grid geometry of each unstructured cell for each property described in the inputted structured grid geological model 106 or the structured grid simulation model 108 are computed and assigned in the unstructured grid geometry generation module 220.

Next, an unstructured grid properties generation module 222 computes and assigns. Property values of each unstructured cell for each property described in the inputted structured grid geological model 106 or the structured grid simulation model 108. An unstructured grid perforation module 222 computes the intersection points of each wellbore trajectory with the finite volume cell faces of all the grid cells penetrated by wellbores in the reservoir being modeled.

After generating the unstructured grid geometry, properties, and perforations via the parallel unstructured model builder 110, the unstructured grid is provided to the workflow interface 200 of the data processing system D where the gridding results are analyzed and verified before the unstructured grid is provided as indicated at 225 to the parallel reservoir simulator 112. The Voronoi cells and grid points of the generated unstructured grid geometry are displayed by a 2D functionality 226 of the work interface of the data processing system D. The generated unstructured grid properties from the module 222 are displayed for analysis by a property analysis map functionality 228 of workflow interface 200 of the data processing system D. The qualities of the generated unstructured grid perforation data from the module 224 are displayed for analysis by a perforation analysis functionality 230 of the workflow interface 200 of the data processing system D.

Pre-processing software interface plays a crucial role by gathering all the required data for gridding and building a simulation model. For intuitive input, such as the size of the model or geological grid type in the model, such as Corner Point Geometry (CPG) or Cartesian, these can be directly transferred from the geological data. However, the selection of most other input parameters, such as the locations of the targeted area for being refined and coarsened, is dependent upon simulation experience. This requires a higher level of petroleum engineering experience and knowledge in order to produce a set of reasonable gridding parameters for unstructured gridding.

So far as is known, defining a region of interest in the pre-processing software is begun with visualizing the well data first in the field. Users then make a closed polygon by mouse-clicking at the computer interface particular locations away from the wells to define a region to enclose all the wells in the model, typically a reservoir polygon. It has been understood that the set of grid spacing used in the simulation model is not unique, in that no particular selected polygon afforded processing advantages over others. Various grid density distributions of refinement and coarsening might be sound and valid for generating an unstructured grid, but the resultant generated unstructured grid would be different from those of other user-selected reservoir polygons. If the resultant generated unstructured grid is very different between different set of gridding parameters, there is often considerable impact on the modeling accuracy and simulation performance. Depending on the complexity of reservoir and the actual grid density distribution, sometimes the impact can be significant. To avoid the heavily needed user manual interaction, minimize user errors, and speed up the modeling lifecycle, the present invention provides machine learning determination and allocation of well data points with convex hull for reservoir regions in unstructured grid reservoir simulation.

In accordance with the present invention, the unstructured grid model building workflow 200 generates unstructured grids based on the reservoir data, and integrates the well data and cell properties on the unstructured grid model. The workflow W prepares history matching data in building the simulation model. During the workflow W, complete well data in the reservoir is first gathered, then examined in a quality control stage, and followed by inputting user selected gridding requirements for the unstructured gridding. To help with the well and grid data quality control, a methodology is provided for data input and examination. The interface provides 3D visualization capability to visualize the well data in both 2D and 3D to provide user an overview on the reservoir location and well complexity.

Figure 3:
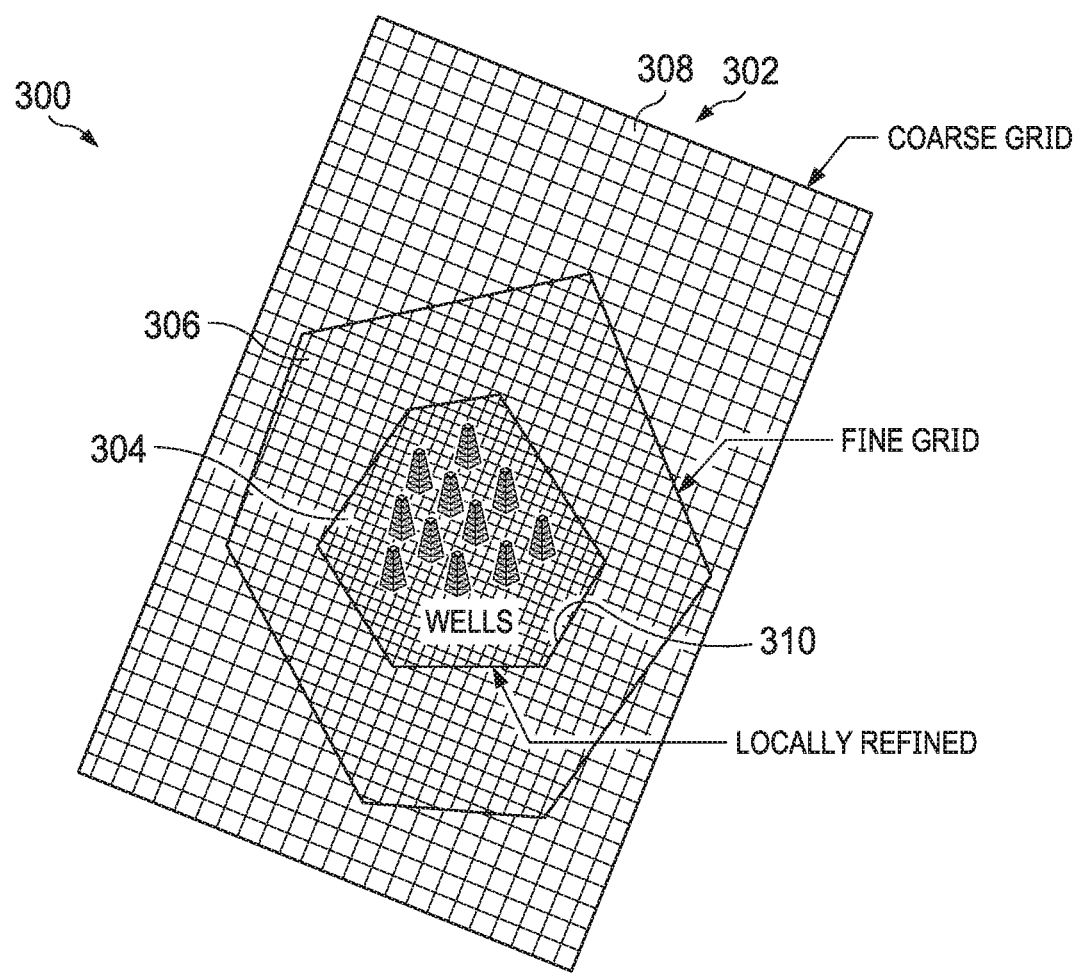
FIG. 3 is a schematic diagram of a reservoir simulation model organized into reservoir regions according to grid spacing of the reservoir grid cells.

The present invention thus guides user selection of specific gridding requirements for the unstructured gridding. FIG. 3 is a schematic diagram of a simulation. model domain 300 into respective regions based on area importance and simulation effort.

Typical gridding parameters requested at this stage include regions of interest in the reservoir as illustrated in FIG. 3. As shown in FIG. 3, there are areas of the reservoir where the grid coarsening and refinement are allocated in a field domain 302 to avoid use of same grid spacing in the entire model with attendant processing complexity and increased computer processing usage time and consequent cost.

In general simulation practice, a locally refined grid is only being generated and applied in a near-well region 304. Intermediate fine gridding is applied in a reservoir region 306, and a coarse grid is applied to portions 308 of field domain 302 in region distant from the wells. By utilizing interested-region based grid spacing control scheme provided with the present invention, a fine grid is being used in the near-well region 304 of the reservoir. Modeling accuracy is accordingly significantly improved without using the fine grid throughout in the entire model. As has been noted, fine gridding for the entire model dramatically slows down simulation runs on the unnecessarily large number of grid cells in the model. This is highly needed when dealing with giant simulation models, such as field models in Middle East.

Grid Coarsening and Refinement Control

Cell spacing control on the coarsening and refinement, as shown in FIG. 3 is specified as the between-cell distance on X and Y directions for each of the regions being defined. The multi-level hierarchy grid generation method is described in the literature as exemplified by Ding, X. Y. and Fung, L. S. K., An Unstructured Gridding Method for Simulation Faulted Reservoirs Populated with Complex Wells. Presented at the SPE Reservoir Simulation Symposium, Houston, USA, 23-25 Feb. 2015; Fung, L. S. K., Ding, X, Y. and Dogru, A. H., Unconstrained Voronoi Grids for Densely Spaced Complex Wells in Full-Field Reservoir Simulation, SPE Journal 163648-PA, 2014; and Fung, L. S. K., Ding, X. Y. and Dogru, A. H., An Unstructured Gridding Method for Densely-Spaced Complex Wells in Full-Field Reservoir Simulation, SPE Reservoir Simulation Symposium, Houston, USA, 18-20 Feb. 2013.

The multi-level hierarchy so described generates multi-level resolution grids in the reservoir, with high resolution grid focused only on the near-well areas. Other specific gridding requirements are also part of the gridding input, such as a) the geological information in the model, b) if there is a need of transferring existing history match data into the simulation model and c) the integration of future wells used for prediction.

Once all the required gridding parameters are collected from the user in the data input interface, a data file is generated for the gridding. The final grid can also be visualized in the interface before the simulation model is created for the simulator.

Workflow Automation

According to the present invention, the gridding and model building procedure is enhanced by introducing automation into the workflow to automate the region allocation, grid spacing selection and default all other necessary parameters. The workflow is automated from gridding to the simulation result analysis. Most of the gridding parameters are defined based on the existing geological information in the model. These are included in the gridding input without user interaction. However, automatically defining the reservoir region can be difficult. The present invention provides a machine learning based method to compute the reservoir region determined as a convex hull of the well dataset.

Figure 4A:
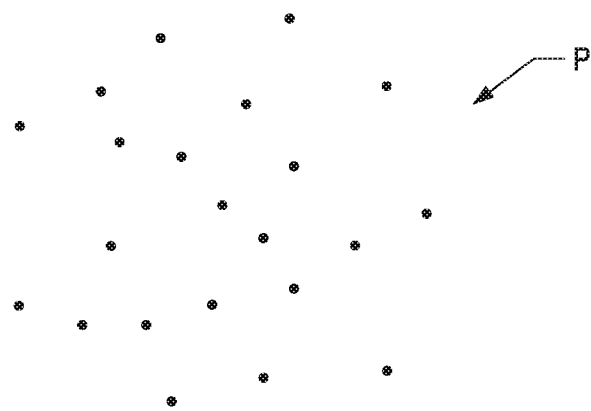
FIGS. 4A and 4B are schematic diagrams illustrating grid data point organization into a convex hull.

A convex hull is defined as a set of points P, on a plane or in space, which represents the smallest convex set of points which encloses all points P. A set of points in 2-dimensional space is illustrated schematically in FIG. 4A, and a convex hull C for that set of points is shown schematically in FIG. 4B.

Figure 4B:
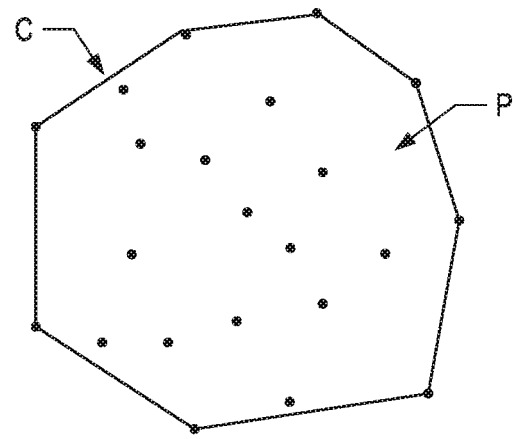

Comparison of the convex hull C in FIG. 4B with the interest-based polygon for the near-well region 304 of FIG. 3 indicates that several similarities are present. With the present invention, it has been found that convex hull computation geometry can be used as a basis for the definition of a targeted reservoir polygon for generation of an unstructured grid for reservoir simulation. With the present invention, a machine learning based method has been developed to compute the convex hull of a given dataset of well trajectory information. The resultant convex hull is then use used as the reservoir polygon for generation of the unstructured grid. As this convex hull generation is implemented by computer processing, thus the interest-based region of the reservoir is formed automatically without any user manual interaction. Computation of the convex hull H for reservoir region is formed according to the workflow W illustrated schematically in FIGS. 2 and 12 and performed by the data processing system D.

Build Well Dataset—Step 400

The well trajectory and completion information is retrieved from well database. In general, the trajectory data point is given as well name, UTM (Universal Transverse Mercator) coordinates in 2D and measured depth. Completion data, is provided as well name, perforation dates and measured depth. The well data can also be transferred from an existing simulation model if the current study continues from a previous simulation. Once all of the well data is in place, data pre-screening is being conducted first by comparing each well's perforation time with the simulation duration in the model. For the wells not in production in the entire simulation study period, they are excluded from the dataset. Quality assurance (QA) then follows by verifying if all well data in the dataset are valid, such as being within the model domain.

Compute Convex Hull of the Well Dataset—Step 402

Figure 5:
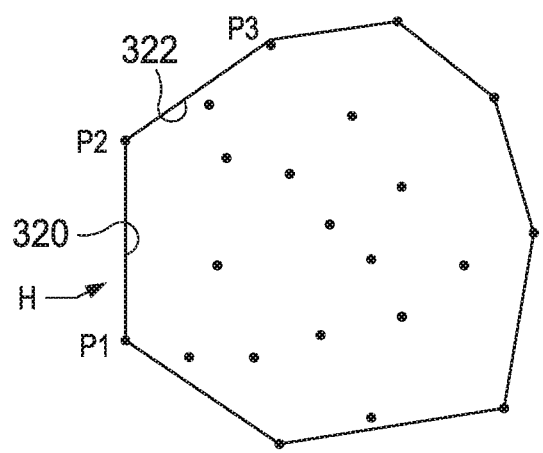
FIG. 5 is a schematic diagram of a convex hull of a well dataset formed according to the present invention for reservoir simulation with an unstructured grid reservoir model.

Convex hull of the well dataset is calculated during step 402. There are several computer automated methodologies of forming convex hulls for a given dataset available. The present invention is based on a machine learning based method which forms the convex hull as a polygon as shown at H in FIG. 5 by maintaining the smallest turning angle from a determined or starting data point while finding the next to be included data point into the convex set. Processing starts with a bottom left data point P1 as seen in FIG. 5. Next, a point is sought from the remaining dataset by keeping all other remaining points on a single side of an edge 320 connected with the point P1. The next to be selected point, in this case point P2 is selected, since all other remaining data points of FIG. 5 are at the right side of edge 320 between points P1 and P2. The convex hull determination iteratively continues by following a clockwise direction. To select a next point to the convex set shown in FIG. 5, a minimum turning angle has to be satisfied. For the example in FIG. 5, point P3 is being selected as edge 322 between points P2 and P3. The edge 322 gives a smallest turning angle while turning from the edge 320. The convex hull determination processing continues in this manner until point P1 is found by giving a last edge to close the polygon H. This methodology guarantees each of the selected edges take the form of the largest possible polygon, and that the polygon H so formed is convex as is seen from FIG. 5.

Figure 6A:
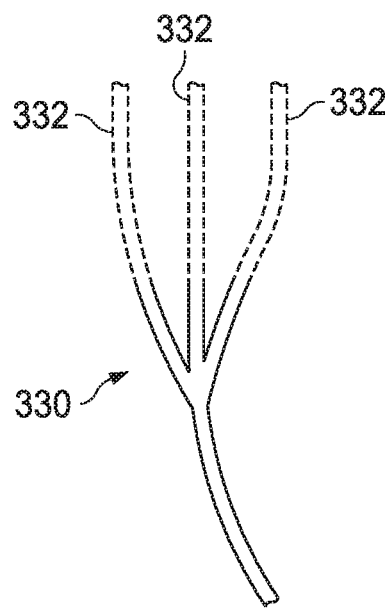
FIG. 6A is a schematic diagram of an example well trajectory in a model of a subsurface reservoir.
Figure 6B:
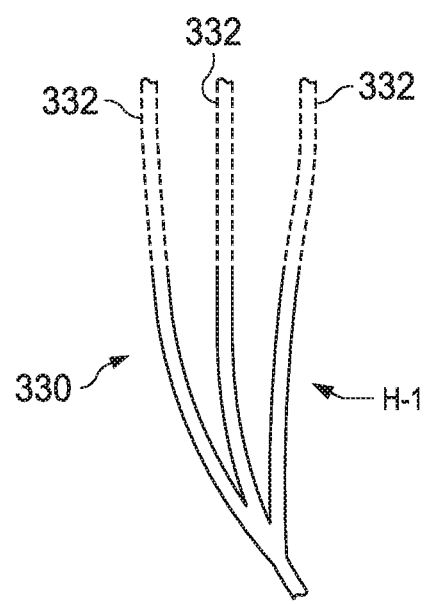
FIG. 6B is a schematic diagram of a convex hull according to the present invention for the dataset of the wall trajectory of FIG. 6A.

An example according to the present invention of a convex hull H-1 of a well dataset is shown in FIGS. 6A and 6B. These figures are schematic diagrams of well trajectory, completion and computed convex hull for a particular maximized reservoir contact or MRC well 330. The well trajectory and completions are schematically illustrated in FIG. 6A. The portion of well 330 which is being perforated is shown at 332. A convex hull computed from the complete well data is shown at H-1 in FIG. 6B. The convex hull is represented by a set of ten points.

It is to be noted that MRC wells can have than tens of thousands of data points stored in the well database 102. In addition it is not unusual that there may be hundreds of these wells in a single reservoir which is the subject of full field reservoir simulation.

Transform the Computed Convex Hull Into Reservoir Region—Step 404

The convex hull polygon H-1 formed in step 402 above encloses all the well data points in the dataset, but it cannot be used directly as a reservoir polygon in the reservoir simulation. As seen in FIG. 3, fine grid spacing is being used inside of the reservoir area 306 while coarse grid is in the field region as indicated at 308 outside of the reservoir. For wells in the convex hull polygon shown at 310 of the reservoir, further grid cell refinement is preferably applied for more detailed near wellbore grid cell modeling.

In unstructured grid modeling described in the technical literature as referenced above, the grid spacing control has three levels—coarse grids in the field area 308, fine grids in the reservoir region 306 away from the wells and further refinement of the fine gridding in the reservoir regions 304 near the wells.

Figure 7:
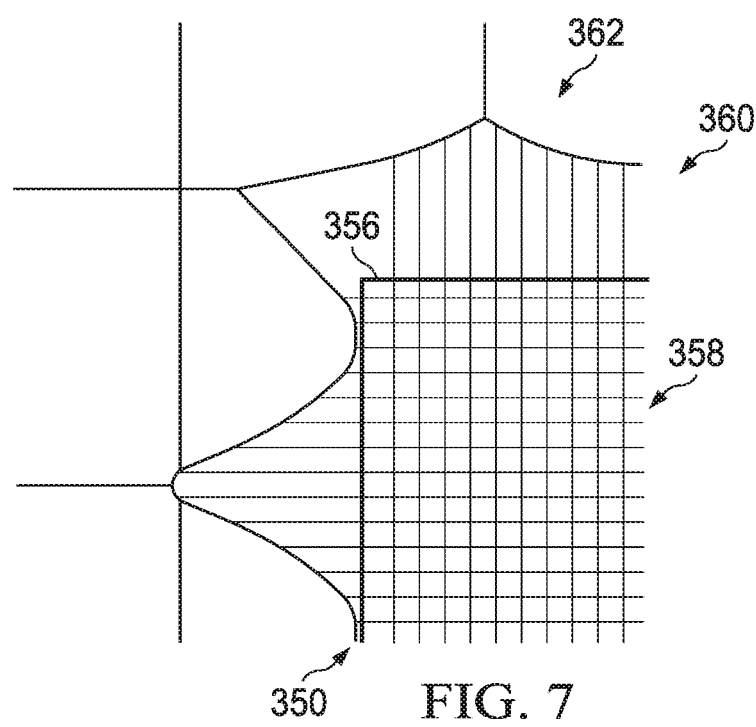
FIG. 7 is a schematic diagram of grid spacing adjustment according to the present invention in reservoir grid model transition zones between different reservoir regions.

If the reservoir polygon 310 is too close to the well, the very fine grid spacing on the wells can be adjacent to the coarse grid indicated at 350 in the field area, as seen in FIG. 7. In cases such as FIG. 7, difficult grid orientation issues can make solver convergence challenging in the reservoir simulation processing.

Figure 8A:
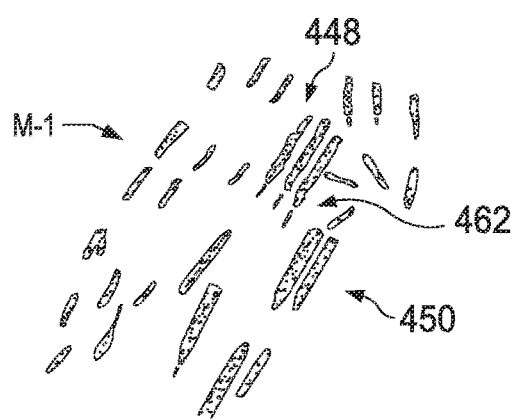
FIG. 8A is a schematic diagram of an example field model of wells in a reservoir.
Figure 8B:
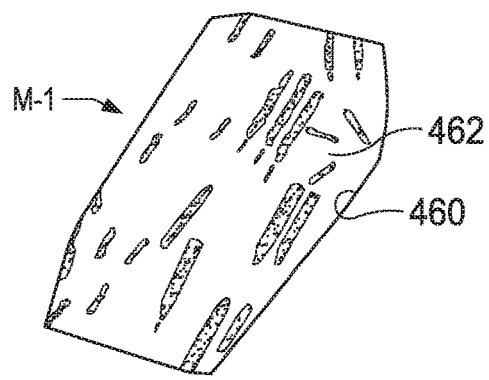
FIG. 8B is a schematic diagram of a convex hull of the well data points determined according to the present invention of the wells of the FIG. 10 is a schematic diagram example field model of FIG. 8A.
Figure 9A:
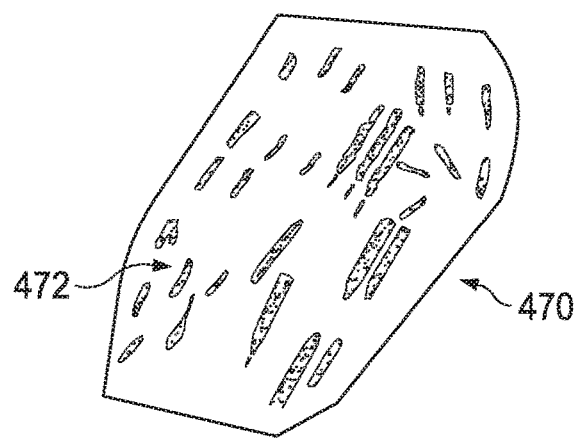
FIG. 9A is a schematic diagram of a convex hull expanded as a reservoir polygon and wells according to the present invention.

FIG. 7 thus illustrates an unsatisfactory or poor grid because a region is not defined correctly. In such a case, the region is expanded by adding in a buffer space. FIG. 8B shows wells 462 and convex hull 460 before such a buffer zone is added. An added buffer zone is shown in FIG. 9A as an empty space 468 between the well boundary 472 and the expanded polygon 470. In this way, the grid spacing change with the present invention is adaptive from the very small grids 358 near the wells to larger grids in the reservoir region 360 away from the wells, Further, the grid spacing is changed to very large grids as indicated at 362 in the field area. The present invention automatically expands the convex hull by a distance of the field grid spacing size.

Figure 12:
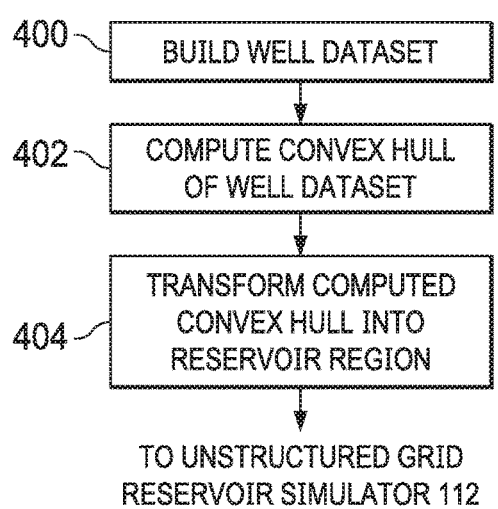
FIG. 12 is a functional block diagram or flow chart of computer processing steps according to the present invention for determination and allocation of well data points with convex hull for reservoir regions in unstructured grid reservoir simulation.

After the computed convex hull is transformed into the reservoir region during step 404, unstructured grid reservoir simulation is performed in simulator 112, as indicated in FIG. 12.

EXAMPLE

A large simulation model M-1 (FIGS. 8A and 8B) with many historical MRC wells 448 is used as an example of the according to the automated simulation workflow according to the present invention. FIG. 8A illustrates in a 2 dimensional or plan view at 450 the wells in the reservoir model M-1. In FIG. 8B, the same wells are within a calculated convex hull 460. FIG. 8B illustrates in a 2 dimensional or plan view of wells in a targeted well zone 462 in the reservoir. In the well database of this example, there are some half million data points stored for these wells. Each of these data points are used as input to compute the convex hull 460. The calculated convex hull 460 encloses each of the wells in the reservoir, but contains thirteen data points from the half million points well dataset.

It is to be noted that the well data points in FIGS. 8A and 8B form a convex set so that the computed convex hull fits the reservoir boundary very well. However, this may not always be the situation due to the reservoir heterogeneity and complexity. For such a diversified reservoir situation, where the well data points take the form of a non-convex or concave set, the calculated hull may need to be adjusted so that there are no large vacant or empty spaces inside the reservoir polygon being formed. The necessity of this adjustment is based on modeling needs and simulation runtime requirements. If an unnecessary fine grid for such an empty or vacant space is not a concern to simulation processing speed there is no need for modification of the convex hull to be formed.

As discussed previously in FIG. 7, the calculated convex hull as shown in FIG. 8B is not used directly in the workflow W, depending on actual grid spacing in the field, reservoir and near-well regions. When the grid spacing changes dramatically from the very fine grid on the well to very coarse grid in the field, a buffer zone is included in the grid model between the field 308 and the near-well area 306 to produce an intermediate size grid as indicated at 360. In this manner, the grid spacing change from well to the field is gradual and adaptive. According to the present invention, the convex hull is expanded by adding in a distance of field grid size for this purpose.

Figure 9B:
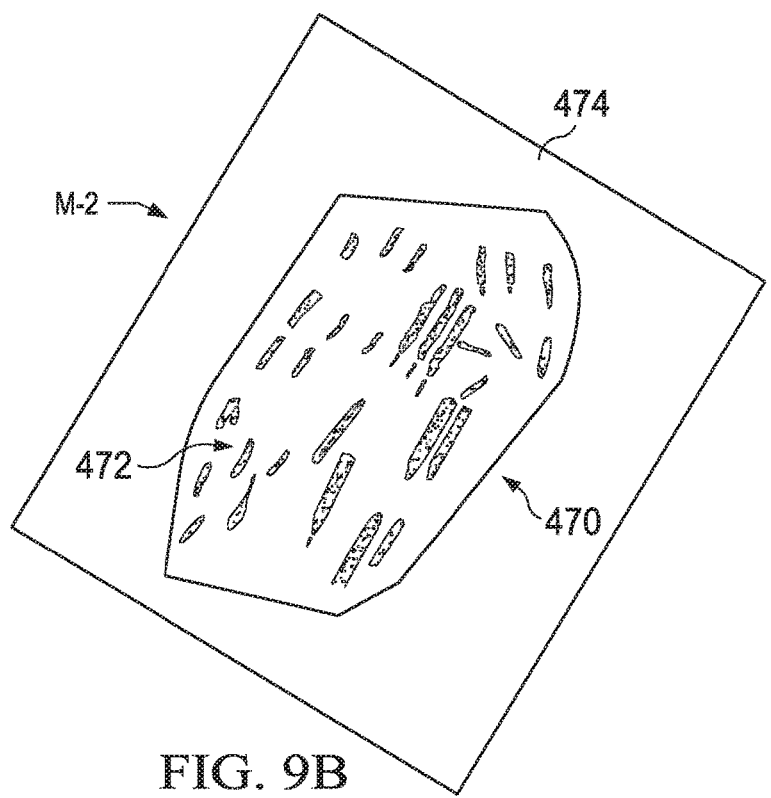
FIG. 9B is a schematic diagram of a field region of a reservoir simulation containing the reservoir polygon and wells of FIG. 9A.

An adjusted convex hull example is shown at 470 in FIG. 9A. The modified convex hull 470 is the reservoir polygon. FIG. 9B shows the reservoir polygon 470 and wells 472 inside a field region 474 of a simulation model M-2. The field polygon 474 is automatically defined by using the geological information in the reservoir model.

Figure 10:
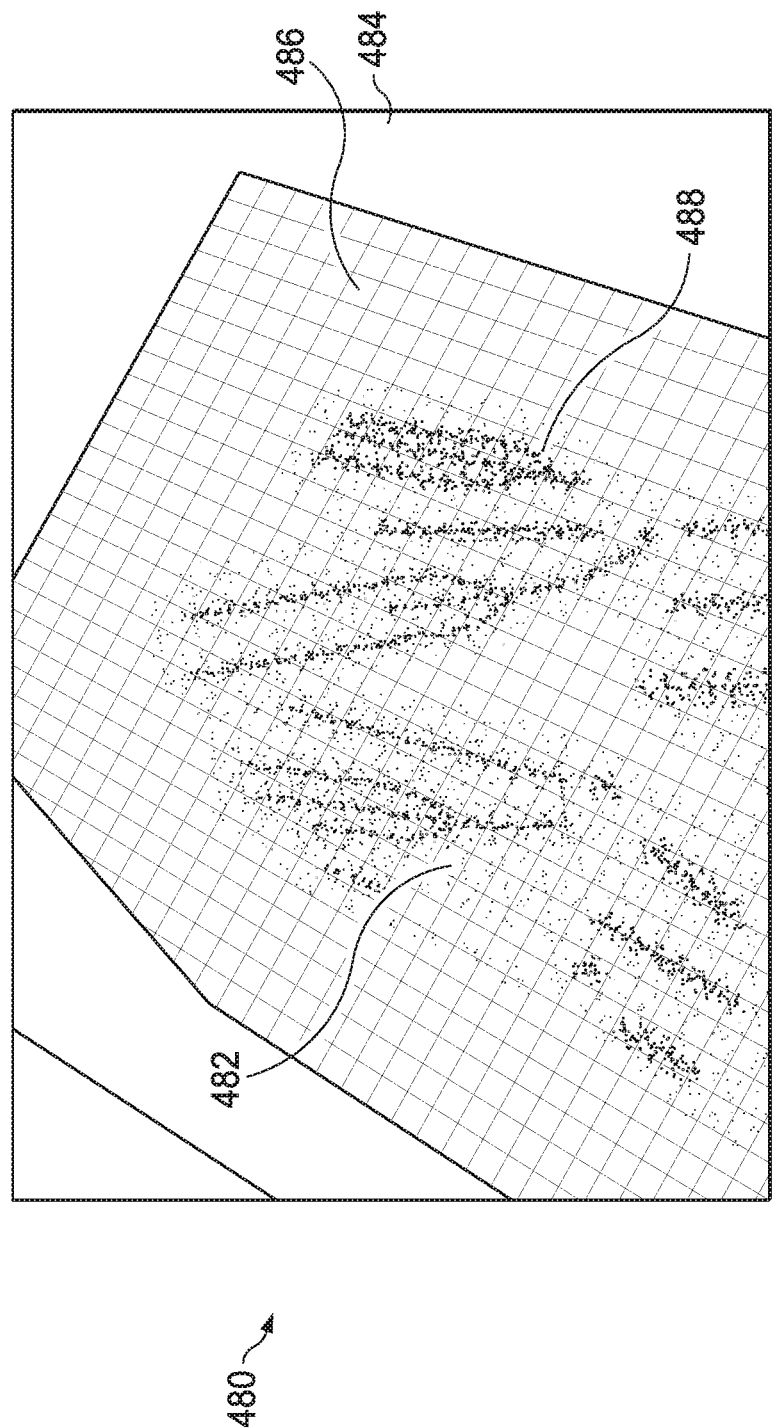
FIG. 10 is a schematic diagram of an example multi-level unstructured grid of a field model.

When the field region 474 and reservoir polygon 470 are defined, the grid spacing for the field, reservoir and near-well area are then determined and passed into the unstructured gridding module 110 for grid generation, reservoir property calculation and unstructured grid simulation model construction. An example of a multi-level unconstrained unstructured grid according to the present invention is depicted at 480 in FIG. 10, FIG. 10 is an enlarged view of the grid in the reservoir at locations of near-well regions 482. The coarse grid at 482 in the field, a less coarse grid at 486 in the reservoir and fine grid 488 near the wells are evident. The gradual change of grid spacing from fine grid region to the coarse area is also clearly demonstrated.

Data Processing System

As illustrated in FIG. 11, the data processing system D includes a computer 500 having a master node processor 502 and memory 504 coupled to the master node processor 502 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y. or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The master node processor 502 is accessible to operators or users through a user interface 506 and is available for displaying output data or records of processing results obtained according to the present invention with the result viewer/output graphic user display 116. The output display 116 includes components such as a printer and an output display screen capable of providing printed output information or visible displays in the form of graphs, data sheets, graphical images, data plots, interactive displays, video displays and the like as output records or images.

The master computer 500 contains reservoir simulator 112 which may, for example, be a reservoir simulator such as those provided under the trademark GigaPOWERS which have been described in the literature. See, for example articles by Dogru, A. et al, "*A Next-Generation Parallel Reservoir Simulator for Giant Reservoirs,*" SPE 119272, Proceedings of the 2009 SPE Reservoir Simulation Symposium, The Woodlands, Tex., USA, Feb. 2-4, 2009 and "*New Frontiers in Large Scale Reservoir Simulation,*" SPE 142297, Proceedings of the 2011 SPE Reservoir Simulation Symposium, The Woodlands, Tex., USA, Feb. 21-23, 2011.

The master node processor 502 also contains the unstructured gridding module 110 which may be of the type described in Applicant's Published U.S. Patent Application No. 2014/0236559, dated Aug. 21, 2014, "Systems, Methods, and Computer-readable Media for Modeling Complex Wellbores in Field-scale Reservoir simulation" (SA5125); or of the type described in Applicant's U.S. Patent Application Publication No. 2015/0260016, dated Sep. 17, 2015, "Modeling Intersecting Faults and Complex Wellbores in Reservoir Simulation" (SA5262).

The user interface 506 of computer 500 also includes a suitable user input device or input/output control unit 508 to provide a user access to control or access information and database records and operate the computer 500. Data processing system D further includes a database 512 of data stored in computer memory, which may be internal memory 504, or an external, networked, or non-networked memory as indicated at 516 in an associated database server 520.

The data processing system D includes program code 522 stored in non-transitory memory 504 of the computer 500. The program code 522 according to the present invention, is in the form of computer operable instructions causing the data master node processor 502 to perform according to the present invention. The processor 502 thus operates according to the methodology illustrated schematically in the drawing figures and described in the text of the present application to determine and allocate well data points with convex hull computation geometry for reservoir regions in unstructured grid reservoir simulation.

The computer memory 504 also contains stored computer operating instructions in the non-transitory form causing and controlling operation of Unstructured Gridding Module 110 and Reservoir Simulator Module 112. The computer memory 504 also stores the data from data base 512 being manipulated and processed by the master node processor 502.

It should be noted that program code 522 may be in the form of microcode, programs, routines, or symbolic computer operable languages that provide a specific set of ordered operations that control the functioning of the data processing system D and direct its operation. The instructions of program code 522 may be stored in memory 504 of the data processing system D, or on computer diskette, magnetic tape, conventional hard disk drive, electronic read-only memory, optical storage device, or other appropriate data storage device having a computer usable non-transitory medium stored thereon. Program code 522 may also be contained on a data storage device such as server 520 as a non-transitory computer readable medium, as shown.

The data processing system D may be comprised of a single CPU, or a computer cluster as shown in FIG. 11, including computer memory and other hardware that makes it possible to manipulate data and obtain output data from input data. A cluster is a collection of computers, referred to as nodes, connected via a network. Usually a cluster has one or two head nodes or master processing nodes 502 that are used to synchronize the activities of the other nodes, referred to as processor nodes 524. The processor nodes 524 all execute the same computer program and work independently on different segments of the grid which represents the reservoir.

The present invention improves reservoir simulation processing by automatically detecting a target area in the reservoir. This is done by determining or computing the convex hull of the well dataset or modified convex hull if concave exists in the dataset. The convex hull processing geometry provides a basis for a reservoir polygon with defined cell spacing computed by cell density control. Automation of the processing in accordance with the present invention considers both the heterogeneity and complexity of the reservoir, such as geological internal boundaries and complicated well geometry. Targeted locations in the reservoir cover areas for which grid refinement is beneficial. In these targeted locations, high density grids are present to capture accurately flow dynamics near the wells. Further, unimportant areas in a reservoir are detected as regions for the grid cell size being coarsened. The present invention thus avoid extremely large reservoir grid model sizes with attendant long simulation computer processing runtimes.

The present invention automatically computes and allocates local reservoir areas for grid coarsening and refinement with respective grid density on the multi-level hierarchical grids. The present invention thus avoids the need for user manual interaction, which is neither efficient nor user friendly during reservoir grid modeling. The automated workflow improves unstructured gridding efficiency and enhances user simulation capabilities.

Unstructured grid simulation workflow is enhanced according to the present invention by automating steps of the reservoir grid modeling workflow. This avoids the need for user manual interaction and minimizes user errors in gridding, simulation model generation and workflow phase transitions.

It can thus be seen that the present invention provides incorporation of machine learning to define regions of interest in unstructured grid simulation models. The reservoir region is automatically created by computing the convex hull of the well data from well database. Reservoir heterogeneity and complexity are being taken into account so that the calculated convex hull is adjusted to honor a concave reservoir boundary, should a well dataset include such a feature. The convex hull can be expanded with the inclusion of a gridding buffer area to the inside of reservoir region to avoid dramatic grid size changes from small grids near wells to a much larger grid sizes in a field region. This minimizes the impact of grid orientation on reservoir simulation solver convergence performance. The automation component in the simulation workflow avoids previous requirements for user manual interaction during the selection and creation of regions of interest. The enhanced workflow automates the unstructured gridding process, speeds up the generation of unstructured grid simulation model and minimize user errors in well data preparation and gridding parameter selection.

It should be noted that the automated workflow does not intend to replace the existing pre-processing software in the workflow. Input interfacing still serves as a valuable tool for an experienced user to visualize and analyze well data, and quickly examine the multi-level grids before the simulation. It should be understood, however, that automated simulation workflow according to the present invention can also be performed by users at different experience levels.

The invention has been sufficiently described so that a person with average knowledge in the matter may reproduce and obtain the results mentioned in the invention herein. Nonetheless, any skilled person in the field of technique, subject of the invention herein, may carry out modifications not described in the request herein, to apply these modifications to a determined methodology, or in the performance and utilization thereof, requires the claimed matter in the following claims; such structures shall be covered within the scope of the invention.

It should be noted and understood that there can be improvements and modifications made of the present invention described in detail above, without departing from the spirit or scope of the invention as set forth in the accompanying claims.

What is claimed is:

1. A method of managing a subsurface hydrocarbon producing reservoir having a plurality of wells, comprising the steps of:
    generating, using actual well trajectories of a plurality of wells in the reservoir, an unstructured grid model of the reservoir, the generating of the unstructured grid model of the reservoir comprising:
        determining a well dataset comprising, for each well of the plurality of wells of the subsurface hydrocarbon producing reservoir, well trajectory data defining a trajectory of the well;
        conducting, using the well trajectory data defining trajectories of the plurality of wells, a convex hull to determine a convex hull comprising a polygon that encloses the trajectories of the plurality of wells;
        determining, based on the convex hull, a reservoir region of the unstructured grid model of the reservoir, the reservoir region having a boundary defined by the polygon, wherein the unstructured grid model of the reservoir comprises a coarse grid size outside of the reservoir region and a fine grid size inside of the reservoir region;
    performing reservoir simulation of production of fluids from the reservoir based on the generated unstructured grid model;
    managing the reservoir based on the results of the performed reservoir simulation of production of fluids, the managing the reservoir comprising adjusting production of fluids from the reservoir.

2. The method of claim 1, wherein the step of generating of the unstructured grid model of the reservoir using actual well trajectory of the plurality of wells in the reservoir is based on input data defining internal boundary geometry and internal boundary descriptions of the reservoir model, and on the well trajectory data and completion data obtained for the plurality of wells in the reservoir.

3. The method of claim 2, wherein the unstructured grid model comprises a buffer region having an intermediate grid size, located between the fine grid size inside of the reservoir region and the coarse grid size outside of the reservoir region.

4. The method of claim 1, wherein managing the reservoir comprises performing further development of the reservoir.

5. The method of claim 1, wherein managing the reservoir comprises drilling a production well in the reservoir.

6. The method of claim 1, wherein managing the reservoir comprises drilling an exploration well in the reservoir.

7. The method of claim 1, wherein generating the unstructured grid comprises defining a buffer zone around the reservoir region, wherein unstructured grid model of the reservoir comprises an intermediate grid size in the buffer zone such that the unstructured grid model of the reservoir comprises an intermediate grid size between the fine grid size inside of the reservoir region and the coarse grid size outside of the reservoir region.

8. A data processing system for generating an unstructured grid model of a subsurface hydrocarbon producing reservoir with actual well trajectories of a plurality of wells of a subsurface reservoir during reservoir simulation, the generating of the model being based on input data defining internal boundary geometry and internal boundary descriptions of the reservoir model provided the data processing system, and on well trajectory and completion data for the plurality of wells in the reservoir obtained during drilling of the wells, the data processing system comprising:
    a memory receiving and storing the provided input data defining internal boundary geometry and internal boundary descriptions of the reservoir model;
    the memory further storing computer operable instructions causing the data processing system to generate the unstructured grid model with actual well trajectory of the plurality of wells during the reservoir simulation;
    a processor generating the unstructured grid model with actual well trajectory of the plurality of wells of the reservoir by performing in the under control of the stored computer operable instructions the steps of:
        receiving from the memory well perforation location coordinates of the plurality of wells in an unstructured grid model of the reservoir based on the well trajectory and completion data for the plurality of wells;
        forming a well dataset of well trajectory locations of the plurality of wells;
        conducting, using the well dataset, a convex hull to determine a convex hull comprising a polygon that encloses the well trajectory locations of the plurality of wells;
        transforming the convex hull into at least one reservoir region of the unstructured grid model of the subsurface reservoir, the reservoir region having a boundary defined by the polygon, wherein the unstructured grid model of the reservoir comprises a coarse grid size outside of the reservoir region and a fine grid size inside of the reservoir region; and a reservoir simulator performing the reservoir simulation of production of fluids from the reservoir based on the generated unstructured grid model,
wherein production of fluids from the reservoir is adjusted based on the results of the reservoir simulation of production of fluids from the reservoir.

9. The data processing system of claim 8, further including a user display forming an output display of the results of the reservoir simulation of production of fluids from the reservoir based on the generated unstructured grid model.

10. The system of claim 8, wherein transforming the convex hull into at least one reservoir region of the unstructured grid model of the subsurface reservoir comprises defining a buffer zone around the reservoir region, wherein unstructured grid model of the reservoir comprises an intermediate grid size in the buffer zone such that the unstructured grid model of the reservoir comprises an intermediate grid size between the fine grid size inside of the reservoir region and the coarse grid size outside of the reservoir region.

11. A computer implemented method of generating an unstructured grid model of a subsurface hydrocarbon producing reservoir with actual well trajectories of a plurality of wells of a subsurface reservoir during reservoir simulation by a data processing system, the generating of the model being based on input data defining internal boundary geometry and internal boundary descriptions of the reservoir model provided the data processing system, and on well trajectory and completion data for the plurality of wells in the reservoir obtained during drilling of the plurality of wells, the data processing system comprising a memory, a processor, and a reservoir simulator, the method comprising the computer implemented steps of:
receiving and storing in the memory the provided input data defining internal boundary geometry and internal boundary descriptions of the reservoir model;
storing in the memory computer operable instructions causing the data processing system to generate the unstructured grid model with actual well trajectory of the plurality of wells during the reservoir simulation;
generating in the processor the unstructured grid model with actual well trajectory of the plurality of wells of the reservoir by performing under control of the stored computer operable instructions the steps of:
receiving from the memory well perforation location coordinates of the plurality of wells in an unstructured grid model of the reservoir based on the well trajectory and completion data for the plurality of wells;
forming a well dataset of well trajectory locations of the plurality of wells;
conducting, using the well dataset, a convex hull to determine convex hull comprising a polygon that encloses the well trajectory locations of the plurality of wells;
transforming the convex hull into at least one reservoir region of the unstructured grid model of the subsurface reservoir, the reservoir region having a boundary defined by the polygon, wherein the unstructured grid model of the reservoir comprises a coarse grid size outside of the reservoir region and a fine grid size inside of the reservoir region; and
performing the reservoir simulation of production of fluids from the reservoir in the reservoir simulator based on the generated unstructured grid model,
wherein production of fluids from the reservoir is adjusted based on the results of the reservoir simulation of production of fluids from the reservoir.

12. The computer implemented method of claim 11, wherein the data processing system further comprises a user display and further including the computer implemented step of forming an output display of the results of the reservoir simulation of production of fluids from the reservoir based on the generated unstructured grid model.

13. The method of claim 11, wherein transforming the convex hull into at least one reservoir region of the unstructured grid model of the subsurface reservoir comprises defining a buffer zone around the reservoir region, wherein unstructured grid model of the reservoir comprises an intermediate grid size in the buffer zone such that the unstructured grid model of the reservoir comprises an intermediate grid size between the fine grid size inside of the reservoir region and the coarse grid size outside of the reservoir region.

14. A data storage device having stored in a non-transitory computer readable medium computer operable instructions for causing a data processing system comprising a processor, a reservoir simulator and a memory, to generate an unstructured grid model of a subsurface hydrocarbon producing reservoir with actual well trajectories of a plurality of wells of a subsurface reservoir during reservoir simulation, the generating of the model being based on input data defining internal boundary geometry and internal boundary descriptions of the reservoir model provided the data processing system, and on well trajectory and completion data for the plurality of wells in the reservoir obtained during drilling of the plurality of wells, the instructions stored in the data storage device causing the data processing system to perform the following steps:
storing in the memory computer operable instructions causing the processor to generate the unstructured grid with actual well trajectory of the plurality of wells during the reservoir simulation;
performing in the processor under control of the stored computer operable instructions the steps of:
receiving from the memory well perforation location coordinates of the plurality of wells in an unstructured grid model of the reservoir based on the well trajectory and completion data for the plurality of wells;
forming a well dataset of well trajectory locations of the plurality of wells in the reservoir;
conducting, using the well dataset, a convex hull to determine a convex hull comprising a polygon that encloses the well trajectory locations of the plurality of wells;
transforming the convex hull into at least one reservoir region of the unstructured grid model of the subsurface reservoir, the reservoir region having a boundary defined by the polygon, wherein the unstructured grid model of the reservoir comprises a coarse grid size outside of the reservoir region and a fine grid size inside of the reservoir region,
wherein production of fluids from the reservoir is adjusted based on the at least one reservoir region of the unstructured grid model of the subsurface reservoir.

15. The data storage device of claim 14, wherein the data processing system further comprises a user display and the instructions further comprise instructions for forming an output display of the results of the reservoir simulation of production of fluids from the reservoir based on the generated unstructured grid model.

16. The device of claim 14, wherein transforming the convex hull into at least one reservoir region of the unstructured grid model of the subsurface reservoir comprises defining a buffer zone around the reservoir region, wherein unstructured grid model of the reservoir comprises an intermediate grid size in the buffer zone such that the unstructured grid model of the reservoir comprises an intermediate grid size between the fine grid size inside of the reservoir region and the coarse grid size outside of the reservoir region.

17. A method of generating an unstructured grid model with actual well trajectories of a plurality of wells of a subsurface reservoir during reservoir simulation by a reservoir simulator of a computer comprising a memory and a processor the generating of the model being based on input data defining internal boundary geometry and internal boundary descriptions of the reservoir model provided the computer, and on well trajectory and completion data for the plurality of wells in the reservoir obtained during drilling of the plurality of wells, the method comprising performing the computer implemented steps of:

storing in the memory computer operable instructions causing the processor to generate the unstructured grid with actual well trajectory of at least one individual well during the reservoir simulation;

performing in the processor under control of the stored computer operable instructions the steps of:

receiving from the memory well perforation location coordinates of the plurality of wells in an unstructured grid model of the reservoir based on the well trajectory and completion data for the plurality of wells;

forming a well dataset of well trajectory locations of the plurality of wells in the reservoir;

conducting, using the well dataset, a convex hull to determine a convex hull comprising a polygon that encloses the well trajectory locations of the plurality of wells in the reservoir;

transforming the convex hull into at least one reservoir region of the unstructured grid model of the plurality of wells of the subsurface reservoir, the reservoir region having a boundary defined by the polygon, wherein the unstructured grid model of the reservoir comprises a coarse grid size outside of the reservoir region and a fine grid size inside of the reservoir region, wherein production of fluids from the reservoir is adjusted based on the at least one reservoir region of the unstructured grid model of the subsurface reservoir.

18. The method of claim 17, wherein transforming the convex hull into at least one reservoir region of the unstructured grid model of the subsurface reservoir comprises defining a buffer zone around the reservoir region, wherein unstructured grid model of the reservoir comprises an intermediate grid size in the buffer zone such that the unstructured grid model of the reservoir comprises an intermediate grid size between the fine grid size inside of the reservoir region and the coarse grid size outside of the reservoir region.

* * * * *

UNITED STATES PATENT AND TRADEMARK OFFICE
CERTIFICATE OF CORRECTION

PATENT NO. : 11,379,640 B2
APPLICATION NO. : 16/737386
DATED : July 5, 2022
INVENTOR(S) : Xiang Yang Ding It is certified that error appears in the above-identified patent and that said Letters Patent is hereby corrected as shown below:

On the Title Page

Column 1, and in the Specification, Column 1, Lines 1-3 the Title should read:
-- RESERVOIR REGIONS MANAGEMENT WITH UNSTRUCTURED GRID RESERVOIR SIMULATION MODEL --

In the Claims

Column 15, Claim 11, Line 55 should read:
-- determine a convex hull comprising a polygon that --

Signed and Sealed this
Thirtieth Day of August, 2022

Katherine Kelly Vidal
*Director of the United States Patent and Trademark Office*